United States Patent [19]

Harasin et al.

[11] Patent Number: 5,151,483
[45] Date of Patent: Sep. 29, 1992

[54] PROCESS FOR THE PRODUCTION OF REINFORCED POLYURETHANE MOLDINGS BY THE REACTION INJECTION MOLDING PROCESS

[75] Inventors: Stephen J. Harasin, Morgan; David F. Sounik, Bridgeville; Timothy J. Kelly, Oakdale, all of Pa.

[73] Assignee: Miles Inc., Pittsburgh, Pa.

[21] Appl. No.: 669,145

[22] Filed: Mar. 13, 1991

[51] Int. Cl.⁵ .................. C08G 18/08; C08G 18/70; B27N 3/10

[52] U.S. Cl. ......................... 528/44; 528/54; 528/58; 528/61; 528/65; 528/67; 528/69; 264/257; 264/300

[58] Field of Search ............... 521/174, 122; 528/65, 528/44, 54, 58, 61, 67, 69; 264/259, 300

[56] References Cited

U.S. PATENT DOCUMENTS

| | | | |
|---|---|---|---|
| Re. 33,609 | 6/1991 | Nodelman | 521/174 |
| 3,991,147 | 11/1976 | Knipp et al. | 264/51 |
| 4,764,540 | 8/1988 | Dewhurst et al. | 521/110 |
| 4,789,688 | 12/1988 | Dewhurst et al. | 521/110 |
| 4,792,576 | 12/1988 | Nodelman | 521/174 |
| 4,847,307 | 7/1989 | Dewhurst et al. | 521/110 |
| 4,868,224 | 9/1989 | Harasin et al. | 521/124 |
| 4,917,902 | 4/1990 | Slocum et al. | 425/553 |

OTHER PUBLICATIONS

Schmuacher et al "Low Viscosity Reinforced Polyurethane Foam Systems for Interior Automotive Panels", ASM International 1987, pp. 151-154.

*Primary Examiner*—John Kight, III
*Assistant Examiner*—John M. Cooney, Jr.
*Attorney, Agent, or Firm*—Joseph C. Gil

[57] ABSTRACT

The present invention is directed to a process for producing a molded part by reacting an organic isocyanate with an active hydrogen group-containing material in the presence of a reinforcing fiber mat in a closed mold via the RIM process. The key to the present invention resides in the use of relatively high viscosity components.

3 Claims, No Drawings

PROCESS FOR THE PRODUCTION OF REINFORCED POLYURETHANE MOLDINGS BY THE REACTION INJECTION MOLDING PROCESS

BACKGROUND OF THE INVENTION

Reaction injection molding (RIM) has become an important process for the manufacture of a wide variety of moldings. The RIM process is a so-called "one-shot" process which involves the intimate mixing of a polyisocyanate component and an isocyanate-reactive component followed by the injection (generally under high pressure) of the mixture into a mold with subsequent rapid curing. The polyisocyanate component is generally a liquid isocyanate. The isocyanate-reactive component generally contains a high molecular weight isocyanate-reactive component (generally a polyol), and usually contains a chain extender or cross-linker containing amine or hydroxyl groups. See, e.g., U.S. Pat. Nos. 3,991,147, 4,764,540, 4,789,688, 4,847,307, and 4,868,224.

In general, the art has looked to various techniques for increasing the flexural modulus of a RIM part. One particularly preferred technique is the use of a reinforcing fiber mat. See, e.g., U.S. Pat. Nos. 4,792,576 and 4,917,902. Problems have been seen in using such mats in the RIM process including displacement of the mat in the mold, incomplete filling of the mold, part distortion, and surface porosity. It is believed that these problems are caused in part by the RIM reactants reaching a high viscosity in too short a time to completely impregnate the mat. Generally, the art worked toward the development of relatively low viscosity components to allow the reinforcing fiber mat to be processed in a closed mold. See, e.g., Schumacher et al, "LOW VISCOSITY REINFORCED POLYURETHANE FOAM SYSTEMS FOR INTERIOR AUTOMOTIVE PANELS'", ASM International, 1987, pages 151-154. Thus, while structural foam systems (i.e., foam systems without fiber reinforcing mats) used isocyanate components having viscosities at 25° C. of 300 mPa.s and isocyanate reactive components having viscosities at 25° C. of 1500 mPa.s, reinforced systems used components having viscosities at 25° C. of only 50 and 180 mPa.s respectively (see the Schumacher et al article). Conventional wisdom believed that since the resistance to flow through the mat is directly proportional to the viscosity of the system, the viscosity had to be kept relatively low (see, also, U.S Pat. No. 4,792,576).

It is also known that in the resin transfer molding of polyesters, variations in polyester resin viscosity do have an effect on the porosity of the molded part and that in some instances increased viscosity of the polyester resin could yield an improvement in surface porosity. However, because polyester resins are very much slower in reactivity when compared to polyurethane RIM systems, and since polyesters are not typically injected at high rates, it was not believed that a similar effect would be seen for reinforced RIM systems.

DESCRIPTION OF THE INVENTION

The present invention is directed to an process for the production of reinforced polyurethane moldings by reacting an organic polyisocyanate, and an isocyanate reactive component in the presence of a reinforcing fiber mat in a closed mold via the RIM process, the improvement wherein:
 i) said isocyanate has a viscosity at 25° C. of at least 200 mPa.s and no more than 1000 mPa.s, preferably from about 300 to about 750 mPa.s, and most preferably from about 300 to about 500 mPa.s,
 ii) said active hydrogen group-containing material has a viscosity at 25° C. of at least about 300 mPa.s and no more than 3000 mPa.s, preferably from about 500 to about 2000 mPa.s, and most preferably from about 750 to about 1500 mPa.s, and
 iii) said mat comprises from about 14% by weight to about 60% by weight of said part, preferably from about 25 to about 55%, and most preferably from about 30 to about 50%.

There are several advantages to utilizing relatively high viscosity components. By using relatively high viscosity components, substantially less air is entrapped, with the result that products of substantially reduced surface porosity are obtained. Substantially, none of the flow problems generally seen in art are encountered. Additionally, low viscosity materials exhibit turbulent flow characteristics during injection, leading to trapped air bubbles. These bubbles are most evident in resin rich areas of the molded part. Such behavior is substantially reduced by using high viscosity components where laminar flow occurs. The art believed that low viscosity components were necessary for good flow and reinforcement wetout and to reduce backpressure. However, while low viscosity materials will flow easily through glass reinforcements, they will usually flow most easily through areas having less restrictions making it more difficult to thoroughly permeate the reinforcement where a higher restriction is encountered. The high viscosity systems of the present invention create their own backpressure and minimize this "differential pressure" problem. In addition, these high viscosity systems do demonstrate adequate flow and glass wetout.

The use of high viscosity systems allows for a wider choice of raw materials when formulating since there is no need to maintain a low viscosity. Changes of viscosity with temperature can also be used by increasing or decreasing temperature to increase or decrease the viscosity of the particular component. This temperature/viscosity relationship can also be used to optimize material flow and impart cosmetic appearance. Finally, insoluble fillers when added to low viscosity components tend to separate and settle upon standing. The use of high viscosity systems allows for better dispersing of the fillers with less settling.

Preferably, the isocyanate reactive component consists of a compatible blend of different isocyanate reactive compounds. The most preferred blend consists of a four functional amine based polyether polyol of low molecular weight (about 356), a glycerine based polyether polyol of molecular weight of about 2800, a 160 molecular weight glycerine based polyether polyol and ethylene glycol. By compatible is meant that no more than 1 percent by weight of the mixture separates after twelve hours storage at room temperature.

Starting isocyanate components suitable for use in the present invention must have a viscosity of at least 200 mPa.s at 25° C. Suitable isocyanates include polyphenyl polymethylene polyisocyanates of the type obtained by condensing aniline with formaldehyde, followed by phosgenation and described, for example, in British Patents 874,430 and 848,671; polyisocyanates containing carbodiimide groups of the type described in U.S. Pat. No. 3,152,162; polyisocyanates containing urethane groups of the type described, for example, in U.S. Pat. No. 3,394,164; and the like.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type described in U.S. Pat. No. 3,644,457. These may be produced for example, by reacting 1 mol of 4,4'-diisocyanatodiphenyl-methane with from 0.05 to 0.3 moles of low molecular weight diols or triols, preferably polypropylene glycols having molecular weights below 700. Also useful are diisocyanates based on diphenylmethane diisocyanate containing carbodiimide and/or uretone imine groups of the type described in U.S. Pat. No. 3,152,162. Mixtures of these preferred polyisocyanates can also be used. Also preferred are the polyphenylpolymethylene polyisocyanates obtained by the phosgenation of an aniline/formaldehyde condensate.

The isocyanate reactive component is generally made up of a variety of isocyanate reactive compounds which are generally known in the polyurethane art. These compounds may be typically divided into two groups, high molecular weight compounds having molecular weights of 400 to about 10,000 and low molecular weight compounds, i.e. chain extenders, having molecular weights of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups (preferably hydroxy groups) of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular L weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found for example in High Polymers, Volume XVI, "Polyurethanes, Chemistry and Technology," by Saunders-Frisch. Interscience Publishers, New York, London, Vol. I, 1962, pages 32-42 and 44-54, and Volume II, 1964, pages 5-6 and 198-199; and in Kunststoff-Handbuch, Vol. VII, Vieweg-Hochtlen, Carl Hanser Verlag, Munich, 1966, pages 45-71.

In accordance with the present invention, the high molecular weight compounds can be used in admixture with up to about 95% by weight based on the total quantity of active hydrogen containing compounds, of low molecular weight chain extenders. Preferred low molecular weight compounds are those containing at least two hydroxyl groups and having molecular weights of below 400. These materials preferably contain 2 or 3 hydroxyl groups. Mixtures of different compounds containing at least two hydroxyl groups and having molecular weight of less than 400 may also be used. Examples of such low molecular weight compounds are ethylene glycol, 1,2- and 1,3-propylene lycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1-1,3-propane diol, glycerol, trimethylol propane, 1,2,6-hexane triol, trimethylol ethane, pentaerythritol, quinitol, mannitol, sorbitol, diethylene glycol, triethylene glycol, tetraethylene glycol, higher polyethylene glycols having molecular weights of less than 400, dipropylene glycol, higher polypropylene glycols having molecular weights of less than 400, dibutylene glycol, higher polybutylene glycols having a molecular weight of less than 400, 4,4'-dihydroxy diphenyl propane, dihydroxy methyl hydroquinone, and the like.

Other low molecular weight polyols having a molecular weight of less than 400 which may be used in accordance with the present invention are ester diols, diol urethanes and diol ureas, of the type described in U.S. Pat. No. 4,792,576, the disclosure of which is herein incorporated by reference.

For certain purposes, it may be advantageous to use polyols containing sulfonate and/or phosphonate groups (German Offenlegungsschrift No. 2,719,372), such as the adduct of bisulfite with 1,4-butene diol or the alkoxylation product thereof.

The reinforcing fiber mats useful in this invention comprise glass mats, graphite mats, polyester mats, polyaramide mats such as KEVLAR mats and mats made from any fibrous material. The mats may be woven or unwoven. So-called "preforms" can also be used. As is known in the art, a preform is a reinforcement which, previous to the the molding operation, has been formed to the shape of the part being produced. Two common processes are used to produce preforms. In the thermoforming method, a thermoplastic binder is applied to the glass fibers to hold the reinforcement together. The reinforcement is then heated to soften the binder and is then transferred to a cold mold where it is compression molded. The mold surface cools the binder and hardens it, forming a three-dimensional reinforcement in the shape of the final part. The second method, known as the directed fiber method, uses a screen which has been fabricated into the shape of the final part. A thermosetting binder and chopped glass fibers are simultaneously blown onto the screen. The screen is then heated to cure the binder. Although the particular mats used in the examples are random continuous strand mats made of glass fiber bundles, woven mats and oriented mats such as uniaxial or triaxial mats may also be used.

Catalysts may also be used in the invention. Suitable catalysts include those known per se, for example tertiary amines such as triethylamine, tributylamine, N-methylmorpholine, N-ethylmorpholine, N-cocomorpholine, N,N,N',N'''-tetramethylethylene diamine, 1,4-diazabicyclo-(2,2,2)-octane, N-methyl-N'-dimethyl aminoethyl piperazine, N,N-dimethylbenzylamine, bis-(N,N-diethylaminoethyl)adipate, N,N-diethylbenzylamine, pentamethyldiethylene triamine, N,N-dimethylcyclohexylamine, N,N,N',N-'tetramethyl-1,3-butane diamine, N,N-dimethylphenylethylamine, 1,2-dimethylimidazole and 2-methylimidazole.

Examples of tertiary amines containing hydrogen atoms capable of reacting with isocyanate groups are triethanolamine, triisopropanolamine, N-methyldiethanolamine, N-ethyldiethanolamine, N,N-dimethylethanolamine and their reaction products with alkylene oxides, such as propylene oxide and/or ethylene oxide.

Other suitable catalysts are silaamines having carbon silicon bonds of the kind described in German Patent 1,229,290. These include 2,2,4-trimethyl-2-silamorpholine and 1,3-diethylaminomethyl tetramethyl disiloxane.

Nitrogen-containing bases such as tetraalkyl ammonium hydroxides; alkali hydroxides such as sodium hydroxide; alkali phenolates such as sodium phenolate; alkali alcoholates such as sodium methylate, and hexahydrotriazines may also be used as catalysts.

Organometallic compounds especially organotin compounds may also be used as catalysts. Preferred organotin compounds include tin-(II)-salts of carboxylic acids, such as tin-(II)-acetate, tin-(II)-octoate, tin-(II)ethylhexoate and tin-(II)-laurate and the dialkyl tin salts of carboxylic acids such as dibutyl tin diacetate, dibutyl tin dilaurate, dibutyl tin maleate or dioctyl tin diacetate.

Further examples of suitable catalysts and details on the way in which the catalysts work can be found in Kunststoff-Handbuch, Vol. VII, published by Vieweg and Hochtlen, Carl-Hanser-Verlag, Munich 1966 page 96–102.

The catalysts are generally used in quantities of from about 0.001 to 10% by weight, based on the quantity of isocyanate reactive compounds.

Surface-active additives (emulsifiers) can also be used. Examples of emulsifiers are the sodium salts of castor oil sulphonates or even of fatty acids or salts of fatty acids with amines such as diethylamine oleate or diethanolamine stearate. Alkali or ammonium salts of sulphonic acids, such as those of dodecylbenzene sulphonic acid or dinaphthylmethane disulphonic acid or even of fatty acids, such as ricinoleic acid, or of polymeric fatty acids, can also be used as surface-active additives.

It is also possible to use reaction retarders, for example, substances with an acid reaction such as hydrochloric acid or organic acid halides. Pigments or dyes and flameproofing agents known per se, such as tris-chloroethyl phosphate or ammonium phosphate and polyphosphate and Mobil's Antiblaze 19 flame retardant may be used. Stabilizers against the effects of aging and weather, plasticizers and substances with fungistatic and bacteriostatic effects, silane materials to improve adhesion of the urethane to the glass fibers, fillers such as barium sulphate, kieselguhr, carbon black, prepared chalk, wollastonite, calcium carbonate, flake glass, glass balls or beads, mica, talc, metal fibers or ceramic fibers, may also be used.

It is also preferred that so-called internal mold release agents be used. Suitable internal mold release agents include those described in U.S. Pat. Nos. 4,789,688, 4,764,540, 4,847,307 and 4,868,224, the disclosures of which are herein incorporated by reference. Also useful are those internal mold release agents described in German Offenlegungsschriften 1,953,637 and 2,121,670. One particularly preferred mold release is a mixture of Silicone DC-193 (available from Dow Corning) and the adduct formed by reacting one mole of N,N'-dimethylpropylamine with two moles of tall oil.

The invention is further illustrated but is not intended to be limited by the following examples in which all parts and percentages are by weight unless otherwise specified.

EXAMPLES

In the examples, the following materials were used:

POLYOL A: an ethylene diamine/propylene oxide adduct having an OH number of 630 (molecular weight of about 356).

POLYOL B: a glycerine/propylene oxide/ethylene oxide adduct having an OH number of about 60 (molecular weight of about 2800 with a weight ratio of PO to EO of about 5:1 with about 73% of the hydroxyl groups being primary OH groups).

POLYOL C: a glycerine/propylene oxide adduct having an OH number of about 1050 (molecular weight of about 160).

DEG: diethylene glycol.

EG: ethylene glycol.

33LV: Dabco 33LV, triethylene diamine, available from Air Products.

TC-290: Topcat 290, a tin catalyst available from Tylo Industries.

ISO A: a polymethylenepoly(phenyl isocyanate) having an NCO content of 32% by weight and a viscosity at 25° C. of 190 mPa.s.

ISO B: a reaction product of tripropylene glycol and 4,4'-methylenebis(phenyl isocyanate), having an NCO content of about 23% by weight and a viscosity at 25° C. of 750 mPa.s.

ISO C: a 1:1 blend of a ISO A and ISO B, with the blend having an NCO content of 27% by weight and a viscosity at 25° C. of 340 mPa.s.

ISO D: a 3:1 blend of ISO A and ISO B, with the blend having an NCO content of 29.7% by weight and a viscosity at 25° C. of 200 mPa.s.

Two different sizes of molded products were prepared. Small (0.78 cm×94 cm×94 cm) panels were prepared using a modified Krauss Maffei KM RIM metering unit and a Newman tiltable press having a maximum pressing force of 50 tons. Large (3 mm×1 m×2 m) panels were prepared using a Hennecke HS3000 lance cylinder RIM metering unit and a Cannon booking and shuttle-bed press with a maximum clamping force of 600 tons.

The viscosities of the formulations, the formulations used and the physical properties obtained were as indicated in the table which follows. The samples were tested for density (ASTM D-1622), tensile strength (ASTM D-638), flexural modulus (ASTM D-790) and notched Izod impact (ASTM D-256). In Examples 1 through 5, a wax-based mold release sold as Chemtrend CT-2006 was used, while in Example 6, a wax-based mold release sold as Chemtrend RCT-2007 KE was used. Inspection of the surface appearance of the panels was performed visually. Samples were rated on a scale of from 0 to 5 as follows:

5 = excellent surface
4 = extremely good surface
3 = very good surface
2 = good surface
1 = poor surface
0 = extremely poor surface.

In the case of the smaller parts, the glass mats were cut and placed in the molds. In the case of the larger parts, the mats were placed in the mold and sheared in place. The row labelled % glass in the table is the % by weight of glass in the final product. The glass mat used each instance was 8610, a continuous strand glass mat available from Owens-Corning Fiberglas. The mats used in Examples 1 through 5 were of 0.06 gram per square centimeter density, while the mat of Example 6 was of 0.09 gram per square centimeter density. Example 5 is a comparative example.

TABLE

| Example | 1 | 2 | 3 | 4 | 5 | 6 |
| --- | --- | --- | --- | --- | --- | --- |
| B-side | | | | | | |
| POLYOL A | 50 | 50 | 50 | 40 | 50 | 50 |
| POLYOL B | 30 | 30 | 30 | 30 | 30 | 30 |
| POLYOL C | 20 | 20 | 20 | 20 | 20 | 20 |
| EG | 5 | 5 | 5 | — | 5 | 5 |
| DEG | — | — | — | 10 | — | — |
| 33LV | 1 | 1 | 1 | 1 | 1.0 | 1.0 |
| TC-290 | 0.1 | 0.1 | 0.1 | 0.1 | 0.1 | 0.1 |

TABLE-continued

| Example | 1 | 2 | 3 | 4 | 5 | 6 |
| --- | --- | --- | --- | --- | --- | --- |
| Viscosity B-side, mPa.s 25° C. | 1775 | 1775 | 1775 | 768 @30° C. | 1775 | 1775 |
| Isocyanate | ISO C | ISO C | ISO C | ISO C | ISO A | ISO D |
| Isocyanate Index | 1.1 | 1.1 | 1.1 | 1.1 | 1.1 | 1.1 |
| Weight ratio Iso:B-side | 182:100 | 182:100 | 182:100 | 177:100 | 169:100 | 156:100 |
| Mold type | small | large | large | small | small | small |
| % Glass | 28 | 29 | 38 | 27 | 38 | 38 |
| Density, g/cc | 1.34 | 1.42 | 1.52 | 1.41 | 1.45 | 1.49 |
| Tensile, N/mm2 | 113.4 | 145.6 | 172.2 | 139.3 | 158.2 | 165.9 |
| Flexural modulus, N/mm2 | 7413 | 8708 | 10115 | 7266 | 8827 | 7952 |
| Notched Izod, N-mm/mm | 370 | 474 | 604 | 452 | 566 | 610 |
| Surface appearance | 2 | 4 | 4 | 3 | 1-2 | 2 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a molded part comprising reacting an organic isocyanate with an active hydrogen group-containing material in the presence of a reinforcing fiber mat in a closed mold via the RIM process, the improvement wherein:
   i) said isocyanate has a viscosity at 25° C. of at least 200 mPa.s and no more than 1000 mPa.s,
   ii) said active hydrogen group-containing material has a viscosity at 25° C. of at least about 300 mPa.s and no more than 3000 mPa.s, and
   iii) said mat comprises from about 14% by weight to about 60% by weight of said part.

2. The process of claim 1 wherein
   i) said isocyanate has a viscosity at 25° C. of from about 300 to about 750 mPa.s,
   ii) said active hydrogen group-containing material has a viscosity at 25° C. of from about 500 to about 2000 mPa.s, and
   iii) said mat comprises from about 25 to about 55%.

3. The process of claim 2 wherein
   i) said isocyanate has a viscosity at 25° C. of from about 300 to about 500 mPa.s,
   ii) said active hydrogen group-containing material has a viscosity at 25° C. of from about 750 to about 1500 mPa.s, and
   iii) said mat comprises from about 30 to about 50%.

* * * * *